United States Patent
Malmström

(10) Patent No.: US 11,549,915 B2
(45) Date of Patent: Jan. 10, 2023

(54) METHOD AND ARRANGEMENT FOR ESTIMATING A MATERIAL PROPERTY OF AN OBJECT BY MEANS OF A LASER ULTRASONIC (LUS) MEASUREMENT EQUIPMENT

(71) Applicant: SSAB TECHNOLOGY AB, Stockholm (SE)

(72) Inventor: Mikael Malmström, Stockholm (SE)

(73) Assignee: SSAB TECHNOLOGY AB, Stockholm (SE)

( * ) Notice: Subject to any disclaimer, the term of this patent is extended or adjusted under 35 U.S.C. 154(b) by 0 days.

(21) Appl. No.: 17/615,880

(22) PCT Filed: Jun. 2, 2020

(86) PCT No.: PCT/EP2020/065142
§ 371 (c)(1),
(2) Date: Dec. 2, 2021

(87) PCT Pub. No.: WO2020/245082
PCT Pub. Date: Dec. 10, 2020

(65) Prior Publication Data
US 2022/0205954 A1      Jun. 30, 2022

(30) Foreign Application Priority Data
Jun. 4, 2019  (EP) ...................................... 19178184

(51) Int. Cl.
*G01N 29/04* (2006.01)
*G01N 29/30* (2006.01)
*G01N 29/11* (2006.01)

(52) U.S. Cl.
CPC ............ *G01N 29/11* (2013.01); *G01N 29/046* (2013.01); *G01N 29/30* (2013.01); *G01N 2291/0234* (2013.01); *G01N 2291/0289* (2013.01)

(58) Field of Classification Search
CPC ...... G01N 29/11; G01N 29/046; G01N 29/30; G01N 2291/0234; G01N 2291/0289
(Continued)

(56) References Cited

U.S. PATENT DOCUMENTS

| | | | |
|---|---|---|---|
| 4,539,848 A | 9/1985 | Takafuji et al. | |
| 5,520,052 A * | 5/1996 | Pechersky | G01H 9/00 73/579 |

(Continued)

FOREIGN PATENT DOCUMENTS

| | | | |
|---|---|---|---|
| CA | 2352839 A1 * | 1/2002 | ......... G01N 29/2418 |
| CN | 101473224 A | 7/2009 | |

(Continued)

OTHER PUBLICATIONS

Monchalin J-P, et al. "Laser-Ultrasonic Development Towards Industrial Applications", Proceedings of the Ultrasonics Symposium. Chicago, Oct. 2-5, 1988; [Proceedings of the Ultrasonics Symposium], New York, IEEE, US, vol. 1, Oct. 2, 1988, pp. 1041-1044.

(Continued)

*Primary Examiner* — Jacques M Saint Surin
(74) *Attorney, Agent, or Firm* — Ballard Spahr LLP

(57) ABSTRACT

Described is a method for estimating a material property of an object by means of a laser ultrasonic (LUS) measurement equipment comprising a generation laser, a detection laser and a detector. The method includes providing a laser pulse onto a surface of the object by the generation laser such that an ultrasonic pulse is generated in the object and such that an ultrasonic vibration is immediately generated on the (Continued)

surface, measuring at least a first subsequent ultrasonic echo from the object by use of the detection laser and the detector, which ultrasonic echo is an echo from the ultrasonic pulse generated in the object, measuring the ultrasonic vibration which is immediately generated on the surface, by use of the detection laser and the detector, and estimating the material property by use of an ultrasonic attenuation parameter based on the measured at least first subsequent ultrasonic echo, whereby the material property is estimated by using the measured ultrasonic vibration which is immediately generated on the surface as reference to the measured at least first subsequent ultrasonic echo.

14 Claims, 6 Drawing Sheets

(58) Field of Classification Search
USPC .......................................................... 73/599
See application file for complete search history.

(56) References Cited

U.S. PATENT DOCUMENTS

| | | | |
|---|---|---|---|
| 5,638,396 A * | 6/1997 | Klimek | G01N 21/1717 |
| | | | 372/102 |
| 6,038,026 A | 3/2000 | Maris | |
| 6,057,927 A * | 5/2000 | Levesque | G01K 17/02 |
| | | | 356/451 |
| 6,532,821 B2 * | 3/2003 | Lamouche | G01N 29/4418 |
| | | | 73/659 |
| 7,353,709 B2 * | 4/2008 | Kruger | G01N 29/11 |
| | | | 73/599 |
| 9,182,375 B2 | 11/2015 | Sano | |
| 9,348,026 B2 | 5/2016 | Armbruster et al. | |
| 9,470,623 B2 | 10/2016 | Sano | |
| 2002/0035872 A1 | 3/2002 | Lamouche et al. | |
| 2007/0006651 A1 * | 1/2007 | Kruger | G01N 29/348 |
| | | | 73/579 |

FOREIGN PATENT DOCUMENTS

| | | | |
|---|---|---|---|
| CN | 204361473 U | | 5/2015 |
| CN | 103782193 A | | 5/2016 |
| GB | 2397650 | * | 8/2004 |
| JP | H05333003 A | | 12/1993 |
| JP | 2005-300356 A | | 10/2005 |
| JP | 2005300356 | * | 10/2005 |
| JP | 2006-084392 | | 3/2006 |
| JP | 2008-116209 A | | 5/2008 |
| JP | 2008-545123 A | | 12/2008 |
| JP | 2012220221 A | | 6/2014 |
| KR | 100 643351 B1 | | 11/2006 |
| KR | 20060035129 A | | 11/2006 |
| KR | 2012 0113161 A | | 10/2012 |
| RU | 2187102 C2 | | 8/2002 |
| RU | 2350944 C1 | | 3/2009 |
| RU | 2405140 C1 | | 11/2010 |
| WO | WO 02/103347 A2 | | 12/2002 |
| WO | WO 2007/003058 A1 | | 1/2007 |
| WO | WO 2012/117493 | | 7/2014 |
| WO | WO 2012/049764 | | 8/2014 |

OTHER PUBLICATIONS

International Search Report and Written Opinion dated Sep. 23, 2020 in PCT Application No. PCT/EP2020/065142 (Published as WO 2020/245082 on Dec. 10, 2020) (13 pages).
International Preliminary Report on Patentability dated Apr. 16, 2021 in PCT Application No. PCT/EP2020/065142 (Published as WO 2020/245082 on Dec. 10, 2020) (46 pages).
Monchalin J.P. et al., Laser-Ultrasonic Development Towards Industrial Applications, Proceedings of the Ultrasonic Symposium.

* cited by examiner

METHOD AND ARRANGEMENT FOR ESTIMATING A MATERIAL PROPERTY OF AN OBJECT BY MEANS OF A LASER ULTRASONIC (LUS) MEASUREMENT EQUIPMENT

CROSS-REFERENCE TO RELATED APPLICATIONS

This application is a U.S. National Phase Application of International Application No. PCT/EP2020/065142, filed Jun. 2, 2020, which claims priority to European Application No. 19178184.8, filed Jun. 4, 2019, each of which are hereby incorporated by reference in their entirety.

TECHNICAL FIELD

The present disclosure relates to a method for estimating a material property of an object by means of a laser ultrasonic (LUS) measurement equipment comprising a generation laser, a detection laser and a detector. The present disclosure further relates to a method for controlling a steel rolling process, an arrangement for measuring a material property of an object, a computer program and/or a computer readable medium carrying a computer program.

BACKGROUND

Hot rolling for producing steel is a commonly known metal working process in which a heated steel material is passed in-between one or more pairs of rollers to reduce the thickness of the material and to make the thickness more uniform. Hot rolling is characterized in that the temperature of the steel is above its recrystallization temperature during the rolling process. The process generally results in an elongated steel plate/strip, such as sheet metal, which may be coiled into a steel coil.

To be able to produce steel with high quality it is important to control the hot rolling process. This may for example be performed by controlling the temperature of the steel material, the pressure provided onto the steel by the rollers, the speed of the rolling process etc. One parameter of the steel which affects the steel properties and hence the steel's quality, is grain size. Therefore, it would be beneficial to be able to measure and estimate grain size of the steel during the hot rolling process and use it for controlling the process such that the steel attains a desired grain size, or a desired grain size range.

One known method for measuring grain size is by use of a so called LUS measurement equipment, in which a laser is used for generating an ultrasonic pulse in the steel material. The ultrasonic pulse generated in the steel propagates through the material and provides an ultrasonic echo, whereby the ultrasonic attenuation of the ultrasonic echo can be determined. The ultrasonic attenuation can be used for estimating grain size of the steel.

One known method for estimating a material property of an object, such as grain size, is disclosed in US 2007/0006651 A1. According to its description, it discloses a method for using ultrasonic attenuation to determine a material property, and involves receiving an interaction signal from an ultrasound detector. The interaction signal captures at least one manifestation of a broadband ultrasonic pulse impinging on a detection location of the object after the ultrasonic pulse has propagated in the object. In propagation through the object, the ultrasonic pulse is attenuated by one or more physical mechanisms. A portion of the interaction signal corresponding to the attenuated ultrasonic pulse is transformed from the time domain to the frequency domain, to obtain an amplitude spectrum. Once the amplitude spectrum is obtained, it is compared with a reference amplitude spectrum to obtain an attenuation spectrum. The attenuation spectrum is then fitted to an attenuation model to derive an attenuation parameter, and the attenuation parameter is used for computing the material property.

Further, the reference amplitude spectrum is produced in a similar manner as the amplitude spectrum by using a reference piece. The reference piece has equivalent diffraction properties as the object with respect to the broadband ultrasonic pulse, but the reference amplitude spectrum is substantially free of attenuation, either because the reference piece has known attenuation parameters which are used to correct for attenuation in the amplitude spectrum of the reference piece, or because the reference piece is selected to provide negligible attenuation.

Hence, the above known method requires that a reference piece is used for estimating the material property. As another example, it is also known to make use of multiple echoes to estimate a material property. Therefore, instead of using a reference piece for the calculation, two ultrasonic echoes may be compared in order to compute the material property.

Although the above methods seem to work for estimating a material property, such as estimating grain size of steel, there is still a strive towards developing a method which is more efficient and useful in a production environment, especially during hot rolling of steel.

SUMMARY

In view of the above, an object of the present invention is to provide an improved method and arrangement for estimating a material property of an object. Further, an object of the present invention is to provide improved control of a steel rolling process by performing in situ measurements of grain size during the steel rolling process.

According to a first aspect, the object is achieved by a method as defined in claim 1. According to a third aspect, the object is achieved by an arrangement as defined in claim 9. According to a fourth aspect, the object is achieved by a steel rolling mill as defined in claim 12. According to a fifth aspect, the object is achieved by a computer program as defined in claim 13. According to a sixth aspect, the object is achieved by a computer readable medium carrying a computer program as defined in claim 14. Further embodiments of the disclosure may be found in the dependent claims and in the accompanying description and drawings.

According to the first aspect thereof, the object is achieved by a method for estimating a material property of an object by means of a laser ultrasonic (LUS) measurement equipment comprising a generation laser, a detection laser and a detector. The method comprises:

providing a laser pulse onto a surface of the object by the generation laser such that an ultrasonic pulse is generated in the object and such that an ultrasonic vibration is immediately generated on the surface, measuring at least a first subsequent ultrasonic echo from the object by use of the detection laser and the detector, which ultrasonic echo is an echo from the ultrasonic pulse generated in the object, measuring the ultrasonic vibration which is immediately generated on the surface, by use of the detection laser and the detector, and estimating the material property by use of an ultrasonic attenuation parameter based on the measured at least first subsequent ultrasonic echo, whereby the material property is estimated by using the measured ultrasonic vibration which is immediately generated on the surface as reference to the measured at least first subsequent ultrasonic echo.

By the provision of the method according to the first aspect of the invention, a material property may be estimated and determined in an improved manner. In fact, the invention is based on the realization of the inventor that when using a LUS measurement equipment, the generation event itself, i.e. the ultrasonic vibration which is immediately generated on the surface, may be measured and used for efficiently estimate and determine the material property of the object, which likely is a metal, preferably steel. A general understanding has been that the generation event, i.e. when a laser pulse is provided onto the surface of the object by the generation laser, cannot be used as a reliable reference since it contains too much light pollution from the generation laser and also too much vibration caused by thermal expansion on the surface. By using the generation event as reference, in comparison to using a reference piece or multiple ultrasonic echoes as known in the prior art, a more efficient measurement and material property estimation may be performed. More particularly, there will be no need of performing measurements on any reference piece. Further, by using the generation event as reference it has been realized that larger grain sizes may be measured and determined compared to when using the multiple echo method. Larger grain sizes will namely result in larger ultrasonic attenuation levels, and thereby it may only be possible to measure one ultrasonic echo with sufficient precision (signal to background ratio).

Accordingly, the ultrasonic vibration which is immediately generated on the surface as used herein refers to the generation event, i.e. the event when the laser pulse is provided onto the surface of the object. This may also be denoted a generation vibration, which is measured and used for the material property estimation. In other words, the generation event corresponds to the point in time when the laser pulse is provided onto the surface of the object. Furthermore, which also will be understood in the below, the measured ultrasonic vibration which is immediately generated on the surface is different from the ultrasonic pulse which has travelled through or on the object surface.

Preferably, the reference may be provided by comparing a spectral amplitude based on the measured at least first subsequent ultrasonic echo with a spectral amplitude based on the measured ultrasonic vibration which is immediately generated on the surface.

Optionally, the object may have a temperature of 600° C. or more when the laser pulse is provided onto the surface of the object. In fact, it has been realized that the generation event can more easily be measured and evaluated at elevated temperatures of 600° C. or more, since at these temperatures the ultrasound induced by the thermal part of the generation becomes smaller than the part from the ablation on the surface. Still optionally, the temperature may be from 800-1200° C., such as 850-950° C., when the laser pulse is provided onto the surface of the object.

Optionally, the measured ultrasonic vibration which is immediately generated on the surface and the measured at least first subsequent ultrasonic echo result in a signal having an amplitude variation in a time domain, wherein the method may further comprise the step of providing a model for converting the signal from the time domain to a frequency domain, and wherein the material property of the object is estimated based on values of the converted signal which are in a frequency range from 3 to 200 MHz, preferably 3-100 MHz, such as 3-40 MHz. It has further been realized that when using the generation event as reference in the aforementioned frequency ranges, it is possible to measure grain size of different objects with different thicknesses without the use of several reference pieces as in the prior art. Hence, the method as disclosed herein has shown to be beneficial in a production environment, especially in a steel rolling mill. Further, the converted signal may be provided by isolating the measured ultrasonic vibration which is immediately generated on the surface and/or the measured at least first subsequent ultrasonic echo by use of a window function, also known as an apodization function or tapering function, such as a Tukey window. Just as a matter of example, the Tukey window may have an $\alpha$-parameter of 0.7 and the window may be larger than two, typically three, times the FWHM (full width half maximum) of the measured ultrasonic vibration which is immediately generated on the surface and/or the measured at least first subsequent ultrasonic echo.

Optionally, the measured ultrasonic vibration which is immediately generated on the surface and the measured at least first subsequent ultrasonic echo result in a signal having an amplitude variation in a time domain, wherein the method may further comprise the step of providing a model for converting the signal from the time domain to a frequency domain, and wherein the material property of the object is estimated based on values in the frequency range of the converted signal which are above a spectral amplitude threshold value, which spectral amplitude threshold value defines a noise floor of the (LUS) measurement equipment underneath which noise floor the converted signal cannot be distinguished from noise. Hence, below the noise floor the ultrasound signal cannot be distinguished. It has further been realized that it is beneficial to use measurements which are above the noise floor, i.e. where there is negligible noise pattern. Noise pattern may be defined as a signal pattern which shows an irregular and/or stochastic pattern. Optionally, the material property of the object may preferably be estimated based on values in the frequency range of the converted signal which are at least ten (10) times above the spectral amplitude threshold value, such as 25 times above the spectral amplitude threshold value, i.e. above the noise floor. Still optionally, the material property of the object may preferably be estimated in a frequency range based on values of the converted signal where the lower frequency limit is at least 60% of a maximum spectral amplitude value of the converted signal, such as at least 75% of the maximum spectral amplitude value. It has namely been realized that a more reliable estimation of the material property may be obtained when using measurements in the above mentioned frequency ranges. As an alternative or a complement, if the slope of the measured ultrasonic attenuation at the lower frequency boundary of the resulting attenuation curve is negative it may mean that diffraction dependent ultrasonic attenuation is too high. Then the lower frequency boundary may be moved to the other side of the attenuation-minimum, where the diffraction dependency is considered negligible.

Optionally, the object may be a metallic object, preferably a steel alloy, wherein the material property is grain size. By grain size of the object is herein meant an average grain size of the object. Grain size may be defined as the diameter of individual grains of a material, such as steel.

Optionally, laser beams of the generation laser and the detection laser may be directed towards the same location on the surface of the object. "Same location" may herein mean that the laser beams are provided a distance from each other on the surface which is 1 mm (millimetre) or less. In other words, the generation and the detection may preferably overlap on the surface. Still optionally, a direction of the laser beam of the generation laser and a direction of the laser beam of the detection laser may be angularly separated relative each other. By providing the generation laser and the detection laser with an angular separation with respect to each other, the measurement may be further improved since the generation laser thereby may cause less disturbance to the detector, which in one embodiment may be an interferometer. It shall however be noted that the method as disclosed herein may also be used by a generation laser and detection laser which laser beams are aligned, i.e. co-axial.

Optionally, the generation laser and the detection laser may be configured to provide different laser beam wavelengths. For example, the detection laser may be configured to provide a larger laser beam wavelength than the laser beam wavelength provided by the generation laser. Just as a matter of example, the generation laser may be configured to provide a laser beam wavelength of 532 nm (nanometres) and the detection laser may be configured to provide a laser beam wavelength of 1064 nm.

According to a second aspect of the disclosure, a method for controlling a steel rolling process is provided, the method comprises:
performing in situ measurements of grain size of a steel object during the steel rolling process by use of the method according to any one of the embodiments of the first aspect, and
controlling the steel rolling process based on the estimated grain size.

Advantages and effects provided by the second aspect are largely analogous to the advantages and effects provided by the method according to the embodiments of the first aspect. It shall also be noted that all embodiments of the second aspect are applicable to and combinable with all embodiments of the first aspect and vice versa.

It has been realized that improved control of the steel rolling process may be provided by using the method according to the first aspect as disclosed herein. More particularly, the grain size of the steel measured during the steel rolling process may be used as feedback information and/or as feed forward information for controlling the process more efficiently and/or for improving the quality of the steel such that it reaches a desired average grain size. The steel rolling process is preferably a hot rolling process. The estimated grain size may e.g. be used for controlling the temperature of the steel, the pressure provided onto the steel by the rollers of the steel rolling mill, the speed of the rolling process etc. Further, the grain size of the steel measured during the steel rolling process may be used as a complement or as an alternative to using temperature as control parameter for the process. Still further, the estimated grain size may e.g. be used for controlling deformation distribution in the steel rolling process.

According to the third aspect thereof, the object is achieved by an arrangement for measuring a material property of an object, comprising:
a laser ultrasonic (LUS) measurement equipment comprising a generation laser, a detection laser and a detector, and
a control unit configured to perform the steps of the method according to any one of the embodiments of the first aspect.

Advantages and effects provided by the third aspect are largely analogous to the advantages and effects provided by the method according to the embodiments of the first and second aspects. It shall also be noted that all embodiments of the third aspect are applicable to and combinable with all embodiments of the first and second aspects and vice versa.

Optionally, laser beams of the generation laser and the detection laser may be directed towards the same location on the surface of the object, and/or a direction of the laser beam of the generation laser and a direction of the laser beam of the detection laser may be angularly separated relative each other.

Optionally, the generation laser and the detection laser may be configured to provide different laser beam wavelengths.

According to the fourth aspect thereof, the object is achieved by a steel rolling mill comprising the arrangement according to any one of the embodiments of the third aspect of the invention. The steel rolling mill is preferably a steel hot rolling mill.

Advantages and effects provided by the fourth aspect are largely analogous to the advantages and effects provided by the method according to the embodiments of the first and second aspects. It shall also be noted that all embodiments of the fourth aspect are applicable to and combinable with all embodiments of the first, second and third aspects and vice versa.

According to the fifth aspect thereof, the object is achieved by a computer program comprising program code means for performing the steps of any of the embodiments of the first and second aspects of the invention, when said program is run on a computer. According to the sixth aspect thereof, the object is achieved by a computer readable medium carrying a computer program comprising program code means for performing the steps of any of the embodiments of the first and second aspects of the invention, when said program product is run on a computer.

Advantages and effects provided by the fourth and fifth aspects are largely analogous to the advantages and effects provided by the methods according to the embodiments of the first and second aspects. It shall also be noted that all embodiments of the fifth and sixth aspects are applicable to and combinable with all embodiments of the first, second, third and fourth aspects and vice versa.

BRIEF DESCRIPTION OF THE DRAWINGS

With reference to the appended drawings, below follows a more detailed description of embodiments of the disclosure cited as examples.

In the drawings.

Figure 1:
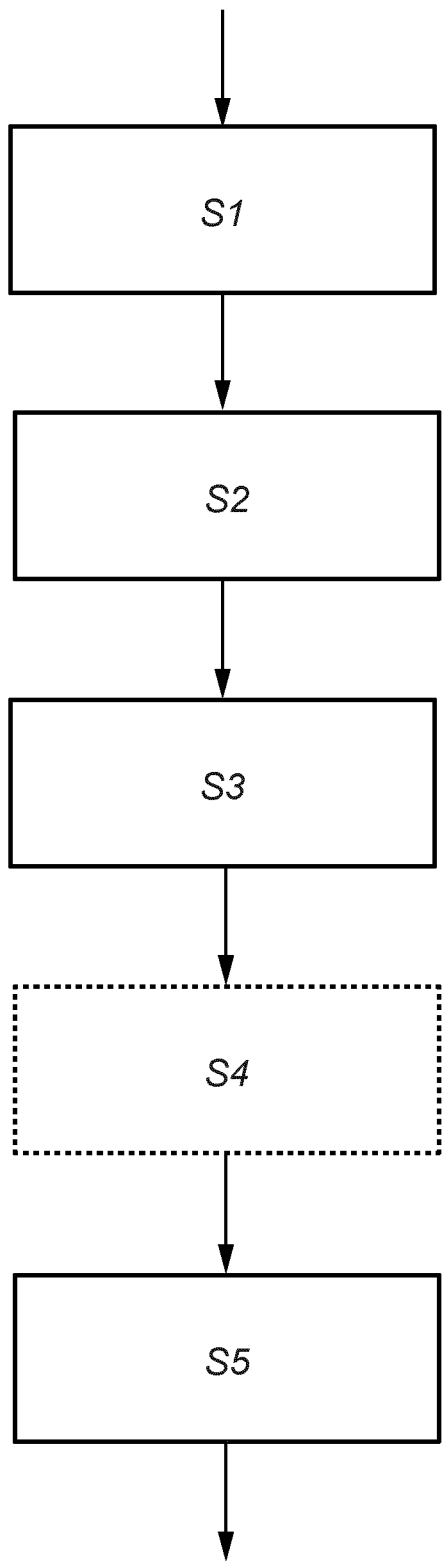
FIG. 1 shows a flowchart of a method according to an example embodiment of the first aspect of the invention.

The drawings show diagrammatic exemplifying embodiments of the present disclosure and are thus not necessarily drawn to scale. It shall be understood that the embodiments shown and described are exemplifying and that the invention is not limited to these embodiments. It shall also be noted that some details in the drawings may be exaggerated in order to better describe and illustrate the particular embodiment. Like reference characters refer to like elements throughout the description, unless expressed otherwise.

DETAILED DESCRIPTION OF PREFERRED EMBODIMENTS

Figure 9:
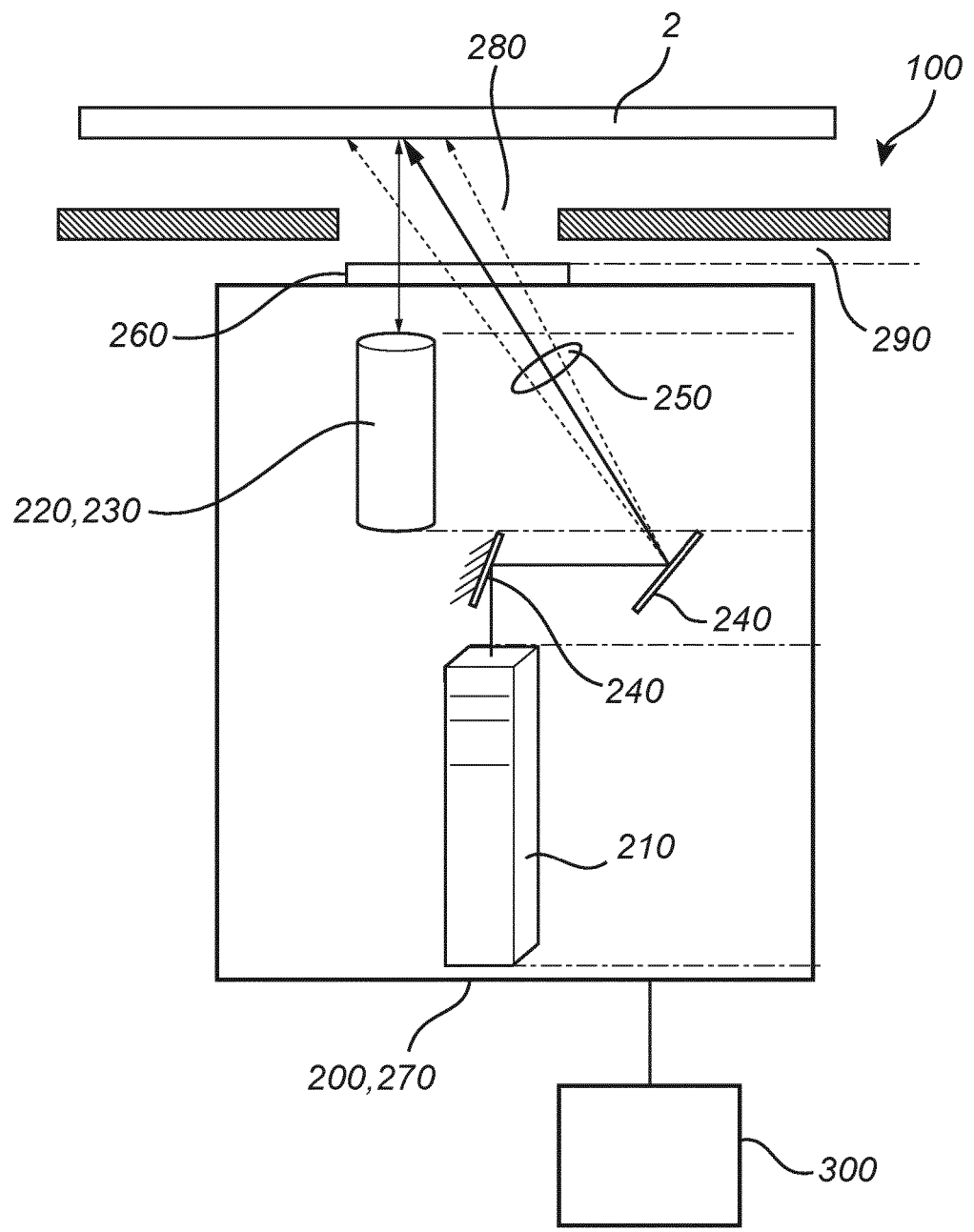
FIG. 9 shows an example embodiment of an arrangement with a LUS measurement equipment according to an example embodiment of the present invention.

In FIG. 1, a flowchart of a method for estimating a material property of an object 2 by means of a laser ultrasonic (LUS) measurement equipment 200 such as shown in FIG. 9 is shown. The LUS equipment 200 comprises a generation laser 210, a detection laser 220 and a detector 230 (see FIG. 9). The method comprises the following steps:

S1: providing a laser pulse onto a surface of the object 2 by the generation laser 210 such that an ultrasonic pulse is generated in the object 2 and such that an ultrasonic vibration is immediately generated on the surface, S2: measuring at least a first subsequent ultrasonic echo from the object 2 by use of the detection laser 220 and the detector 230, which ultrasonic echo is an echo from the ultrasonic pulse generated in the object 2, S3: measuring the ultrasonic vibration which is immediately generated on the surface, by use of the detection laser 220 and the detector 230, and S5: estimating the material property by use of an ultrasonic attenuation parameter based on the measured at least first subsequent ultrasonic echo, whereby the material property is estimated by using the measured ultrasonic vibration which is immediately generated on the surface as reference to the measured at least first subsequent ultrasonic echo.

The method preferably further comprises a step S4 of providing a model for converting the signal from the time domain to a frequency domain. This step is optional as indicated by the box S4 with dashed lines in FIG. 1. The signal may be converted by use of a Fourier transform model.

Figure 2:
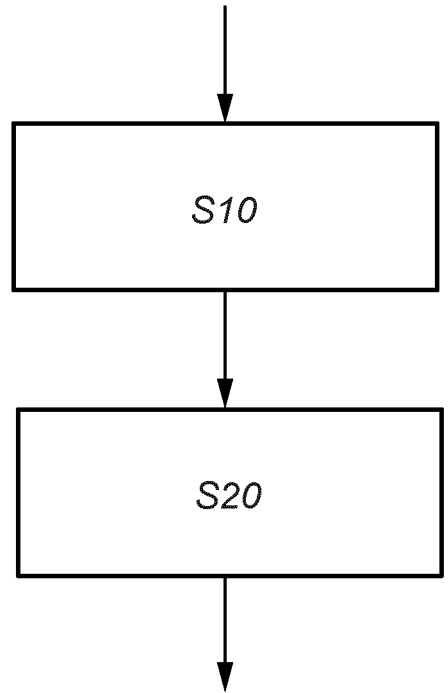
FIG. 2 shows a flowchart of a method according to an example embodiment of the second aspect.

In FIG. 2, a flowchart of a method for controlling a steel rolling process according to an example embodiment of the second aspect is shown. The method comprises the following steps:

S10: performing in situ measurements of grain size of a steel object 2 during the steel rolling process by use of the method according to any one of the embodiments according to the first aspect of the invention, and S20: controlling the steel rolling process based on the estimated grain size.

With respect to especially FIGS. 3-7, an example and embodiments of the present invention according to the first aspect of the invention will be described.

First, the total ultrasonic attenuation has three contributing factors and may be expressed as:

$$\alpha(f, \overline{D}, T) = \alpha_{absorption}(T) + \alpha_{diffraction}(f, T) + \alpha_{scattering}(f, \overline{D}, T)$$

Where $\alpha\_absorption$ is the material absorption due to internal friction, $\alpha\_diffraction$ is the attenuation due to diffraction, and $\alpha\_scattering$ is the signal attenuation due to scattering. Further, f is the frequency, $\overline{D}$ is the average grain size of the object, T is the object temperature. Hence, according to an example embodiment, the temperature T of the object is also measured in situ during the steel rolling process. For example, temperature is generally measured in several different positions in a steel rolling mill, and these measurements may be used for the present invention. As an alternative, the temperature T of the object may be approximated and/or predefined.

Figure 3:
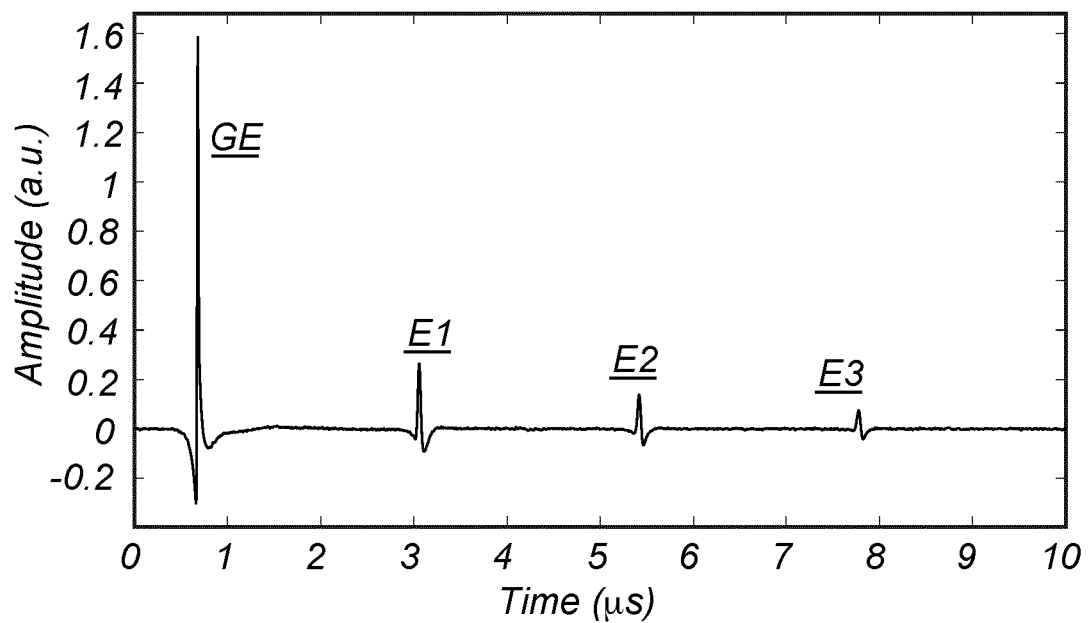
FIG. 3 shows a graph of a measured amplitude of ultrasonic attenuation in the time domain according to an example embodiment of the present invention.

FIG. 3 shows an example of a measurement performed by use of a detector 230 of a LUS measurement equipment 200 after a laser pulse has been provided onto a surface of a steel object 2. The vertical axis defines amplitude and the horizontal axis is time in μs. The measured signal has been band pass filtered using a digital $4^{th}$ order Butterworth filter with phase shift compensation and 3 dB limits between 3 and 100 MHz. The first relatively large amplitude variation GE which occurs immediately when the laser pulse is provided onto the surface is the ultrasonic vibration which is immediately generated on the surface, i.e. the generation event. Subsequently, a first ultrasonic echo E1 is observed by the detector 230, followed by smaller echoes, E2-E3. The observations from the generation event GE and the subsequent echoes may then be converted from the time domain to a frequency domain, e.g. by use of a Fourier transform model as mentioned in the above.

Figure 4:
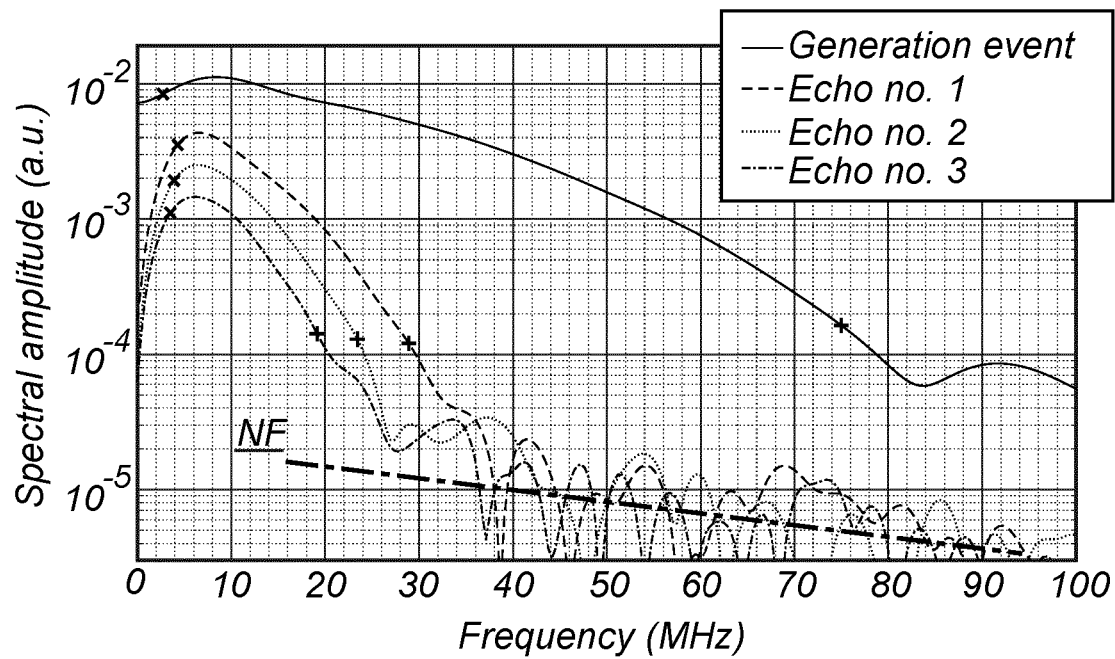
FIG. 4 shows a graph of a spectral amplitude in the frequency domain according to an example embodiment of the present invention.

The spectral content is shown in FIG. 4, comprising the echoes E1-E3 and the generation event GE. Values "+" are chosen for the spectral attenuation and the values may preferably be about 25 times above a noise floor NF (shown by the dash/dotted line), as shown in FIG. 4. Values "x" are chosen as 75% of the maximum spectral amplitude value.

Figure 5:
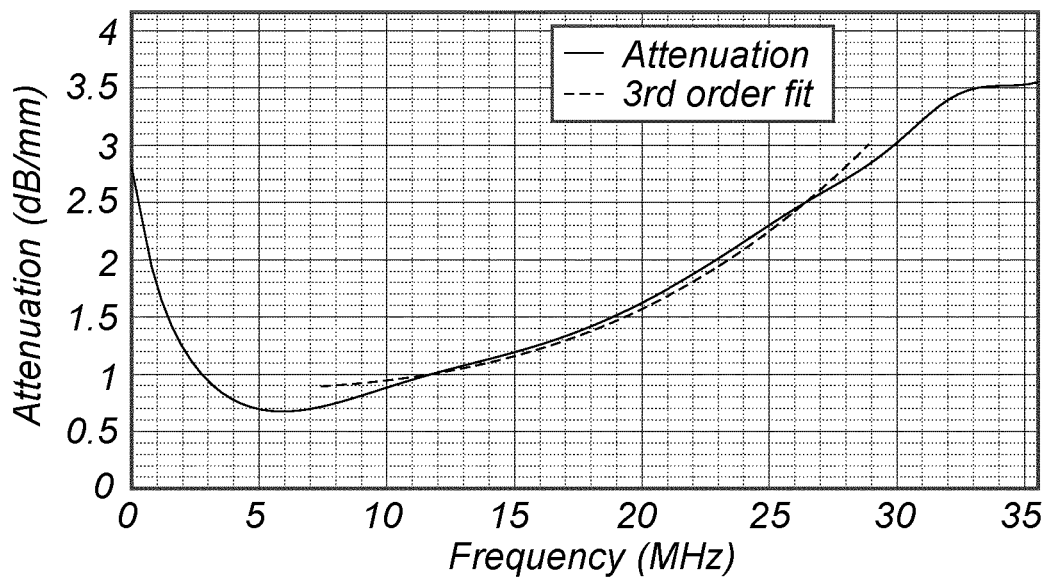
FIG. 5 shows a graph of a spectral amplitude attenuation calculated according to an example embodiment of the first aspect of the invention.

An example of a calculated spectral attenuation by using the measured generation event as reference is shown in FIG. 5. The calculation may e.g. be performed by the following formula:

$$\alpha_{GE-n}(f, \overline{D}, T) = -\frac{20}{\Delta d} \log_{10} \frac{A_n(f, \overline{D}, T)}{A_{GE}(f, \overline{D}, T)}.$$

where $A_{GE}$ and $A_n$ is the spectral content from the measurements of the generation event GE and one of the echoes E1-E3, respectively. Further, $\Delta d$ is the distance travelled from the generation event GE to echo number n. Preferably, the spectral content $A_{E1}$ of the first echo E1 is used, which shows the largest amplitude variation in the time domain.

The ultrasonic attenuation due to grain boundary scattering is dependent on the wavelength of the ultrasonic sound and the size of the grains. A general expression may be written as:

$$\alpha \sim \Gamma(T) D^{n-1} f^n,$$

where n is dependent on the scattering regime (Rayleigh n=4, stochastic n=2), and $\Gamma(T)$ accounts for the temperature dependent anisotropy and apparent wavelength due to temperature dependent velocity. In the wavelength range considered here, n~3, result in the expression:

$$\alpha = a + b * f^3,$$

The $3^{rd}$ order polynomial above may then be fitted to the spectrally relevant part of $\alpha_{GE-n}$, i.e., between value "x" and value "+" from FIG. 4 where the lower frequency boundary, "x", may be adjusted to a region with negligible diffraction, using the least square method and is displayed as the dashed line in FIG. 5. The fitted b-parameter can be plotted against the metallographic grain size (which may be found by sample quenching, and microscopy) and a calibration curve fit can be performed that correlates with the measured spectral attenuation to the grain size. Following the convention in the formulas as mentioned in the above, the correlation between metallographic average grain size $\overline{D}_l$ and the b-parameter can be written as $$\sqrt{|1000b|} = \Gamma(T)\delta\overline{D}_i,$$

where $\delta$ is a material parameter dependent on the anisotropy of the material. A higher $\delta$ value implies that the acoustic impedance mismatch between two neighboring grains is large and thus the scattered portion of the energy is larger.

Figure 6:
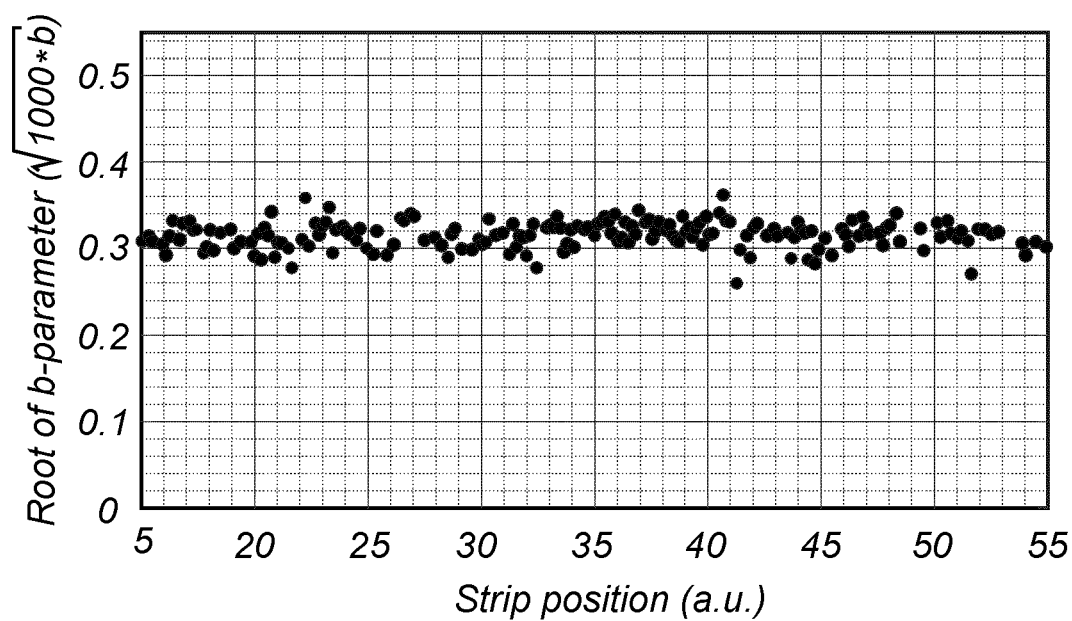
FIG. 6 shows a graph of a calculated b-parameter according to an example embodiment of the first aspect of the present invention.
Figure 7:
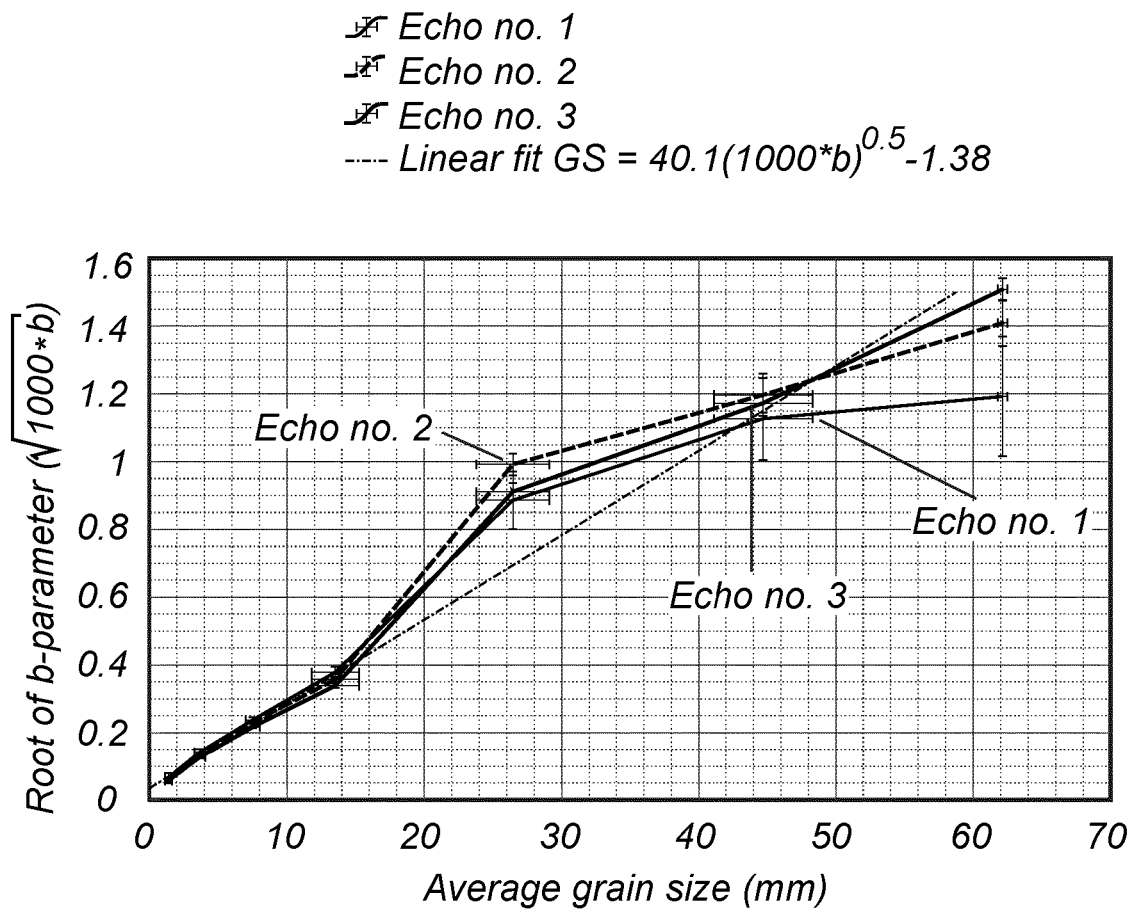
FIG. 7 shows calculated calibration curves obtained from measurements using the method according to the first aspect of the invention.

An example of calculated b-parameters by using the generation event as reference according to the first aspect of the invention is shown in FIG. 6. The steels were in this example at room temperature of 25° C. From the calculated b-parameters using a pre-recorded generation event from a steel mill in which the steel temperature was 900° C., an estimation of grain size was performed. More particularly, in FIG. 7 an example of the calculated calibration curve with the b-parameter which is plotted against grain size is shown.

In the shown example, seven stainless steel (SAE 304) samples were characterized with LUS according to the invention, and twin samples were destructively examined by cutting them in half and imaging the grain boundaries of the cross section with light optic microscope (LOM) and electron backscatter diffraction microscope (EBSD). The grain sizes were taken as the average of the mean linear intercept length in the transverse and in the direction of the ultrasound propagation. The linear fit was weighted by the spread in both grain size estimation and in the b-parameter calculation.

Figure 8:
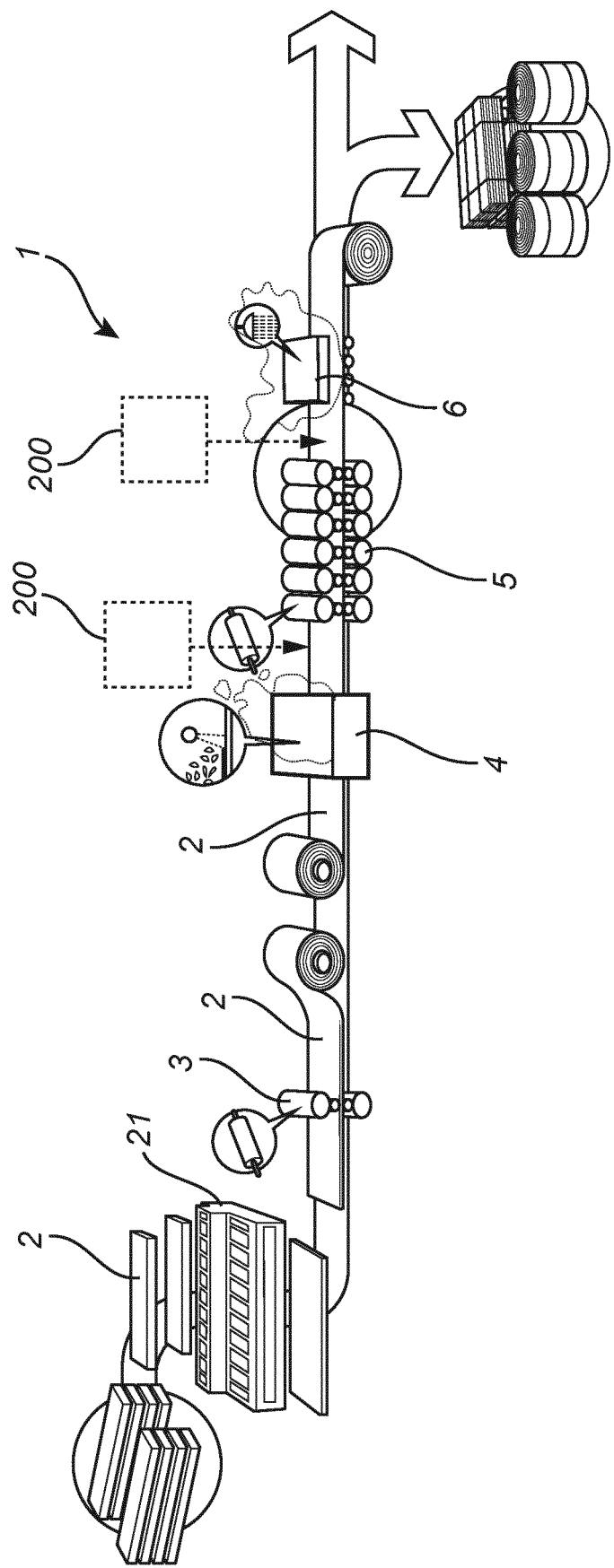
FIG. 8 shows an example embodiment of a steel rolling mill and an arrangement according to an example embodiment of the third aspect of the invention.

FIG. 8 shows a steel hot rolling mill 1 comprising an arrangement 100 having a LUS measurement equipment 200 according to the third aspect of the invention. The steel hot rolling mill may for example be a hot strip mill. From the left-side of the figure, steel slabs 2 are heated in a slab furnace 21 to a specific rolling temperature, such as to about 1250° C. In a next step, the steel slab 2 is entered into a roughing mill 3, where the thickness of the steel slab is reduced, for example from about 200 mm to 30 mm, and increases in length, becoming a steel transferbar. Thereafter the steel transferbar 2 is coiled. Thereafter the steel transferbar 2 enters the hot rolling mill 1 where it first may be cleaned in a cleaning equipment 4 to remove mill scale. In a subsequent step, the steel transferbar 2 is rolled by one or more pairs of oppositely located rollers 5. In the shown example there are six pairs of rollers. The pair of rollers 5 reduce the thickness of the steel transferbar, such as to 1.8 to 16 mm. The rolling speed at the end of the hot rolling mill 1 may be as high as 15 m/s. Thereafter the thin steel strip 2 is cooled in a cooling section ROT (run out table) equipment 6 and coiled and/or cut into a specific length.

The hot rolling process may be controlled by estimating the average grain size of the steel plate 2 during the hot rolling process. For example, a LUS measurement equipment 200 which is connected to a control unit 300 which comprises a computer program which performs the steps of an embodiment of the first aspect of the invention may be placed before and/or after the pair of rollers 5, as indicated in FIG. 8, and/or in-between two adjacent pairs of rollers. The control may be feedback and/or feed forward control. As stated in the above, speed, roller pressure, temperature etc. may be controlled in order to reach a desired grain size of the finished steel strip.

FIG. 9 shows a schematic view of an arrangement 100 for measuring a material property of a steel object 2 in a steel rolling process, comprising:
- a LUS measurement equipment 200 comprising a generation laser 210, a detection laser 220 and a detector 230, and
- a control unit 300 configured to perform the steps of the method according to any one of embodiments of the first aspect of the invention.

For performing the method according to any one of the embodiments of the present invention, the control unit 300 may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The LUS measurement equipment 200 may further comprise one or more fixed and/or movable mirrors 240, lenses 250 and a protective screen with funnel 260, where all or most of the components are provided in a housing 270. The direction onto the surface of the steel strip 2 of the laser beam of the generation laser 210 and the detection laser 220 may be non co-axial, as shown in FIG. 9. The laser beams are further emitted through an opening 280 of a wall 290.

It is to be understood that the present disclosure is not limited to the embodiments described above and illustrated in the drawings; rather, the skilled person will recognize that many changes and modifications may be made within the scope of the appended claims.

The invention claimed is:

1. A method for estimating grain size of a metallic object by means of a laser ultrasonic (LUS) measurement equipment comprising a generation laser, a detection laser and a detector, the method comprising:
    providing a laser pulse onto a surface of the object by the generation laser such that an ultrasonic pulse is generated in the object and such that an ultrasonic vibration is immediately generated on the surface,
    measuring at least a first subsequent ultrasonic echo from the object by use of the detection laser and the detector, which ultrasonic echo is an echo from the ultrasonic pulse generated in the object, characterized in that the method further comprises:
  measuring the ultrasonic vibration which is immediately generated on the surface, by use of the detection laser and the detector, and
  estimating the grain size by use of an ultrasonic attenuation parameter based on the measured at least first subsequent ultrasonic echo, whereby the grain size is estimated by using the measured ultrasonic vibration which is immediately generated on the surface as reference to the measured at least first subsequent ultrasonic echo, whereby the reference is provided by comparing a spectral amplitude based on the measured at least first subsequent ultrasonic echo with a spectral amplitude based on the measured ultrasonic vibration which is immediately generated on the surface.

2. The method according to claim 1, wherein the object has a temperature of 600° C. or more when the laser pulse is provided onto the surface of the object.

3. The method according to claim 2, wherein the temperature is from 800-1200° C. when the laser pulse is provided onto the surface of the object.

4. The method according to claim 1, wherein the measured ultrasonic vibration which is immediately generated on the surface and the measured at least first subsequent ultrasonic echo result in a signal having an amplitude variation in a time domain, wherein the method further comprises providing a model for converting the signal from the time domain to a frequency domain, and wherein the grain size of the object is estimated based on values of the converted signal which are in a frequency range from 3 to 200 MHz.

5. The method according to claim 1, wherein the measured ultrasonic vibration which is immediately generated on the surface and the measured at least first subsequent ultrasonic echo result in a signal having an amplitude variation in a time domain, wherein the method further comprises providing a model for converting the signal from the time domain to a frequency domain, and wherein the grain size of the object is estimated based on values in the frequency range of the converted signal which are above a spectral amplitude threshold value, which spectral amplitude threshold value defines a noise floor of the LUS measurement equipment underneath which noise floor the converted signal cannot be distinguished from noise.

6. The method according to claim 1, wherein laser beams of the generation laser and the detection laser are directed towards the same location on the surface of the object.

7. The method according to claim 1, wherein a direction of the laser beam of the generation laser and a direction of the laser beam of the detection laser are angularly separated relative each other.

8. The method according to claim 1, wherein the generation laser and the detection laser are configured to provide different laser beam wavelengths.

9. An arrangement for measuring grain size of a metallic object, comprising:
  a LUS measurement equipment comprising a generation laser, a detection laser and a detector, and
  a control unit configured to perform the steps of the method according to claim 1.

10. The arrangement according to claim 9, wherein laser beams of the generation laser and the detection laser are directed towards the same location on the surface of the object, and/or wherein a direction of the laser beam of the generation laser and a direction of the laser beam of the detection laser are angularly separated relative each other.

11. The arrangement according to claim 9, wherein the generation laser and the detection laser are configured to provide different laser beam wavelengths.

12. A steel rolling mill comprising the arrangement according to claim 9.

13. A computer program comprising program code means for performing the steps of claim 1, when said program is run on a computer.

14. A computer readable medium carrying a computer program comprising program code means for performing the steps of claim 1, when said program product is run on a computer.

* * * * *